US012770067B2

(12) United States Patent
McCourt et al.

(10) Patent No.: US 12,770,067 B2
(45) Date of Patent: Oct. 20, 2026

(54) SYSTEMS AND METHODS FOR AN ACCELERATED AND ENHANCED TUNING OF A MODEL BASED ON PRIOR MODEL TUNING DATA

(71) Applicant: Intel Corporation, Santa Clara, CA (US)

(72) Inventors: Michael McCourt, San Francisco, CA (US); Ben Hsu, San Francisco, CA (US); Patrick Hayes, San Francisco, CA (US); Scott Clark, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 18/397,909

(22) Filed: Dec. 27, 2023

(65) Prior Publication Data

US 2024/0127124 A1 Apr. 18, 2024

Related U.S. Application Data

(63) Continuation of application No. 17/071,929, filed on Oct. 15, 2020, now Pat. No. 12,159,209.

(60) Provisional application No. 62/940,373, filed on Nov. 26, 2019, provisional application No. 62/923,694, filed on Oct. 21, 2019.

(51) Int. Cl.

| | |
|---|---|
| ***G06N 20/20*** | (2019.01) |
| ***G06F 18/21*** | (2023.01) |
| ***G06F 18/211*** | (2023.01) |
| ***G06F 18/22*** | (2023.01) |
| ***G06F 18/23*** | (2023.01) |

(52) U.S. Cl.

CPC .......... *G06N 20/20* (2019.01); *G06F 18/211* (2023.01); *G06F 18/217* (2023.01); *G06F 18/22* (2023.01); *G06F 18/23* (2023.01)

(58) Field of Classification Search

None

See application file for complete search history.

(56) References Cited

U.S. PATENT DOCUMENTS

| | | | | |
|---|---|---|---|---|
| 8,364,613 | B1 | 1/2013 | Lin et al. | |
| 10,217,061 | B2 * | 2/2019 | Hayes | G06N 20/00 |
| 10,282,237 | B1 * | 5/2019 | Johnson | G06F 11/3495 |
| 11,120,368 | B2 * | 9/2021 | Varadarajan | G06N 7/01 |
| 11,151,480 | B1 * | 10/2021 | Golovidov | G06F 16/904 |

(Continued)

OTHER PUBLICATIONS

"Hyperparameter Optimization to Improve Bug Prediction Accuracy", Osman et al, 2017. 6 pages (Year: 2017).*

(Continued)

*Primary Examiner* — Haimei Jiang

(74) *Attorney, Agent, or Firm* — Nicholson De Vos Webster & Elliott LLP

(57) ABSTRACT

Disclosed examples including generating a joint model based on first and second subject models, the first and second subject models selected based on a relationship between the first and second subject models; selecting the joint model from a plurality of joint models after a determination that entropy data points of the joint model satisfy a threshold, the entropy data points based on multiple tuning trials of the joint model; and providing tuning data associated with the joint model to a tuning session of a target model.

20 Claims, 3 Drawing Sheets

(56) References Cited

U.S. PATENT DOCUMENTS

| | | | | |
|---|---|---|---|---|
| 11,176,487 | B2 * | 11/2021 | Varadarajan | G06N 20/00 |
| 11,620,568 | B2 * | 4/2023 | Moghadam | G06N 3/045<br>706/12 |
| 2016/0110657 | A1 * | 4/2016 | Gibiansky | G06N 20/00<br>706/12 |
| 2016/0132787 | A1 * | 5/2016 | Drevo | G06N 20/10<br>706/12 |
| 2016/0232540 | A1 * | 8/2016 | Gao | G06Q 30/0641 |
| 2017/0124487 | A1 * | 5/2017 | Szeto | G06F 11/1448 |
| 2018/0121797 | A1 * | 5/2018 | Prabhu | G06Q 40/02 |
| 2019/0355438 | A1 * | 11/2019 | Venn | G16B 40/00 |
| 2020/0012935 | A1 * | 1/2020 | Goodsitt | G06F 11/3608 |
| 2020/0285964 | A1 * | 9/2020 | Cao | G06F 18/217 |
| 2021/0142224 | A1 | 5/2021 | McCourt et al. | |

OTHER PUBLICATIONS

United States Patent and Trademark Office, "Final Office Action," issued in connection with U.S. Patent Application No. 17/,071,929 dated Jun. 11, 2024, 20 pages.

United States Patent and Trademark Office, "Notice of Allowance and Fee(s) Due," issued in connection with U.S. Appl. No. 17/071,929, dated Aug. 2, 2024, 8 pages.

Bergstra et al., "Hyperopt: a Python Library for Model Selection and Hyperparameter Optimization," Computational Science & Discovery, No. 8, Jul. 28, 2015, 25 pages.

Johnson et al., "U.S. Appl. No. 62/578,886," filed Oct. 30, 2017, 30 pages.

Raver119, "How Hyperparameter Tuning Works", Medium, retrieved from <https://raver119.medium.com/how-hyperparameter-tuning-works-dcdc39d346cf>, published Jul. 26, 2020, 5 pages.

United States Patent and Trademark Office, "Notice of Allowance and Fee(s) Due," issued in connection with U.S. Appl. No. 17/071,929, dated Oct. 4, 2023, 8 Pages.

United States Patent and Trademark Office, "Corrected Notice of Allowability," issued in connection with U.S. Appl. No. 17/071,929, dated Oct. 17, 2023, 10 pages.

United States Patent and Trademark Office, "Notice of Allowability," issued in connection with U.S. Appl. No. 17/071,929, dated Oct. 25, 2023, 10 pages.

United States Patent and Trademark Office, "Notice of Allowability," issued in connection with U.S. Appl. No. 17/071,929, dated Nov. 2, 2023, 10 pages.

United States Patent and Trademark Office, "Non-Final Office Action," issued in connection with U.S. Appl. No. 17/071,929, dated Jan. 18, 2024, 10 pages.

* cited by examiner

SYSTEMS AND METHODS FOR AN ACCELERATED AND ENHANCED TUNING OF A MODEL BASED ON PRIOR MODEL TUNING DATA

CROSS-REFERENCE TO RELATED APPLICATIONS

This patent arises from a continuation of U.S. patent application Ser. No. 17/071,929, filed on Oct. 15, 2020, which claims benefit of U.S. Provisional Patent Application No. 62/923,694, filed on Oct. 21, 2019 and U.S. Provisional Patent Application No. 62/940,373, filed on Nov. 26, 2019, all of which are hereby incorporated herein by reference in their entireties.

TECHNICAL FIELD

The inventions relate generally to the computer optimization and machine learning fields, and more specifically to a new and useful intelligent hyperparameter optimization in the computer optimization and machine learning fields.

BACKGROUND

Modern machine learning capabilities are rapidly changing and improving how some of the most complex and data-intensive computing problems are solved. A performance of a machine learning model is governed mainly in the manner(s) in which the machine learning model is trained using data samples as machine learning training input and based on the hyperparameters of the machine learning model set prior to the training of the model. As referenced in passing the hyperparameters of the machine learning models are parameters whose values are set prior to the commencement of the machine learning process rather than derived by the machine learning model during training. Example include the number of trees in a random forest or the number of hidden layers in a deep neural net. Adjusting the values of the hyperparameters of a machine learning model by any amount typically results in a large impact on a performance of the machine learning model.

However, many existing machine learning models are not implemented with optimal hyperparameters well-suited for achieving the best predictive performances. Rather, the many existing machine learning models are implemented with default hyperparameters that have not been optimized for a specific computing problem for which the machine learning models are being used.

Additionally, any existing system that enables optimization of hyperparameters of a machine learning model typically includes an extremely complex interface that may require significant coding capabilities and comprehension of the underlying software and hardware components of the system. Thus, making it difficult to efficiently and effectively enable optimizations and subsequent improvements of the machine learning models.

Thus, there is a need in the machine learning field to create an improved optimization platform to test and improve machine learning models (e.g., in-product machine learning models) and an associated Application Program Interface that enables developers to efficiently and effectively interact with a robust system implementing the evaluation framework. The embodiments of the present application described herein provide technical solutions that address, at least, the need described above, as well as the technical deficiencies of the state of the art described throughout the present application.

BRIEF SUMMARY OF THE INVENTION(S)

Figure 1:
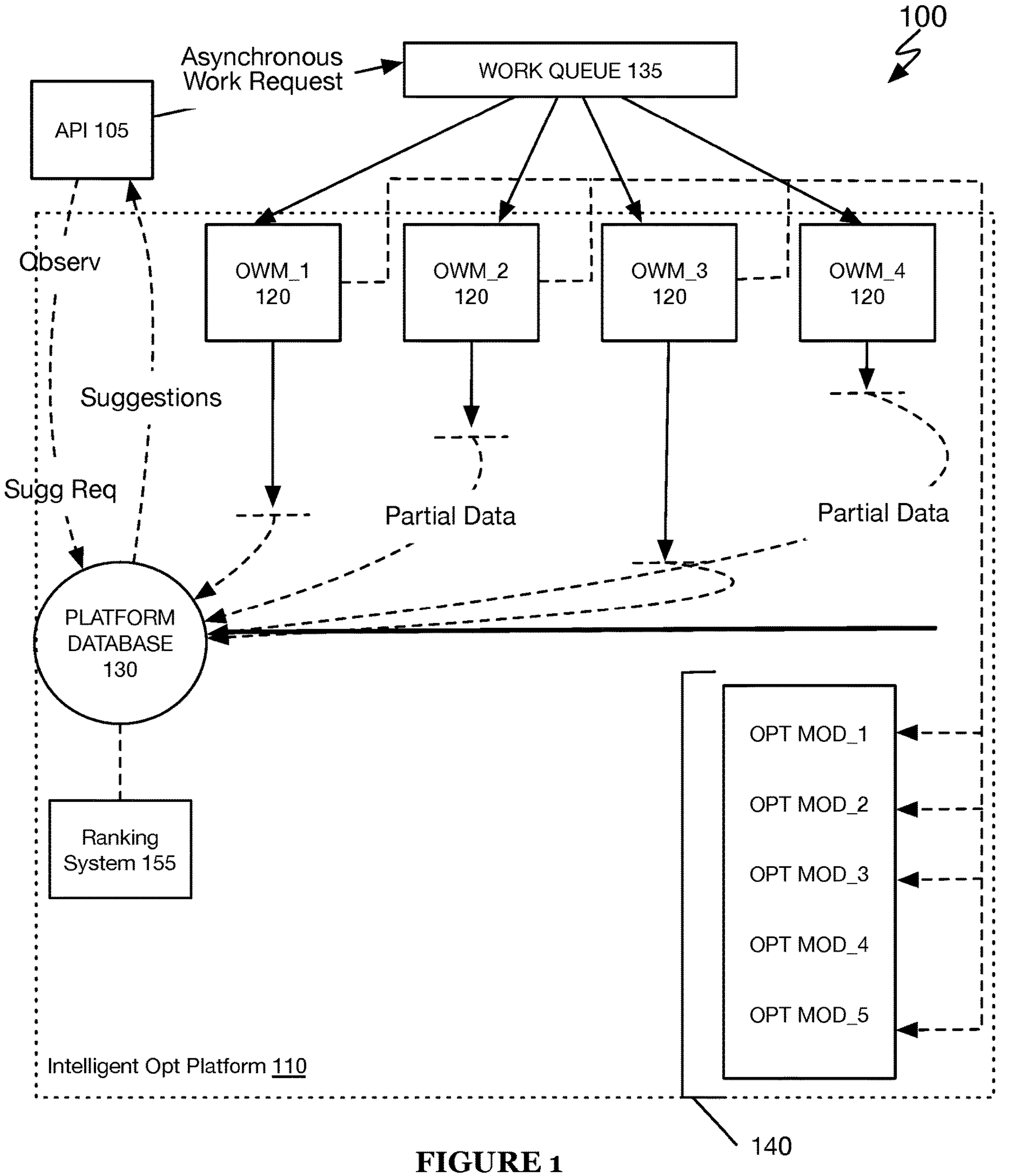
FIG. 1 illustrates a schematic representation of a system 100 in accordance with one or more embodiments of the present application.

In one embodiment, a method for an accelerated tuning of hyperparameters of a model supported with prior learnings data includes assessing one or more groupings of subject models associated with a plurality of distinct sources of transfer tuning data, wherein the assessing includes implementing one or more of: [1] a model relatedness assessment for each of a plurality of distinct pairwise subject models, and [2] a model coherence assessment for each of the plurality of distinct pairwise subject models; constructing a plurality of distinct prior mixture models based on one or more of the relatedness metric value and the coherence metric value for each of the plurality of distinct pairwise subject models, wherein the plurality of distinct prior mixture models comprise a composite of two or more of the subject models of the one or more groupings of subject models; assessing each of the plurality of distinct prior mixture models; identifying a model evidence fraction for each of the plurality of distinct prior mixture models based on the assessment; identifying one or more sources of transfer tuning data from among the plurality of distinct sources of transfer tuning for an accelerated tuning of a target model based on identifying a distinct prior mixture model having a satisfactory model evidence fraction; and accelerating a tuning of hyperparameters of the target model based on transfer tuning data obtained from the identified one or more sources of transfer tuning data associated with the distinct prior mixture model having the satisfactory model evidence fraction.

In one embodiment, implementing the model relatedness assessment includes: computing a relatedness metric value for each of the plurality of distinct pairwise of subject models, wherein the relatedness metric value relates to a computed value probative of a degree of relation between at least two distinct models.

In one embodiment, computing the relatedness metric value includes: testing each subject model of each distinct pairwise with a common corpus of test stimulus; computing one or more performance metrics for each subject model of the distinct pairwise based on the testing; and evaluating the one or more performance metrics for subject models of the distinct pairwise for similarity.

In one embodiment, the method includes assessing the relatedness metric value for each of the plurality of distinct pairwise of subject models against a relatedness threshold, wherein if the relatedness metric value for a given pairwise of the plurality of distinct pairwise satisfies the relatedness threshold, identifying subject models of the given pairwise as suitable candidates for the plurality of distinct prior mixture models.

In one embodiment, implementing the model relatedness assessment includes: computing a coherence metric value for each of the plurality of distinct pairwise of subject models, wherein the coherence metric value relates to a measure that identifies or indicates a degree to which output data of subject models of a given pairwise of subject models at least two models under evaluation come into alignment and/or match up.

In one embodiment, computing the coherence metric value includes: testing each subject model of each distinct pairwise with a common corpus of test stimulus; building an output distribution for each subject model of a subject pairwise of subject models based on output datasets for each subject model; comparing the output distribution for each subject model of the subject pairwise to determine a degree of coherence based on the comparison.

In one embodiment, computing the coherence metric includes: testing each subject model of each distinct pairwise with a common corpus of test stimulus; mapping output values resulting from the testing in a multi-dimensional space; and identifying the coherence metric value for each distinct pairwise based on an overlap between cluster of output values of subject models of the distinct pairwise.

In one embodiment, the method includes identify one or more maximum coherence points between a pairwise of subject models, wherein a maximum coherence point relates to an instance in which an output data point of subject models defining a distinct pairwise converge.

In one embodiment, in response to identifying the one or more maximum coherence points, identifying test input data values that create the one or more maximum coherence points; and defining a corpus of maximum coherence test input data comprising the identified test input data values.

In one embodiment, constructing the plurality of distinct prior mixture models includes: identifying a subset of the subject models having a relatedness metric value and a coherence metric value that satisfy a relatedness threshold and a coherence threshold, respectively; selecting the two or more subject models from the subset.

In one embodiment, assessing each of the plurality of distinct prior mixture models includes: providing a common input dataset to each of the plurality of distinct prior mixture models; setting an output dataset for each of the plurality of distinct prior mixture models as a model evidence quantity for each respective one of the plurality of distinct prior mixture models; fractionally comparing the model evidence quantity of a pair of the plurality of distinct prior mixture models; and generate a model evidence fraction for a joint prior mixture model defining a dividend in the fractional comparison.

In one embodiment, the method includes initializing a tuning operation for tuning hyperparameters of the target model, wherein initializing the tuning operation includes: identifying one or more of the plurality of distinct prior mixture models having a maximum informational entropy, wherein maximum informational entropy relates to one or more points produced by one or more a priori models that best inform a current state of knowledge.

In one embodiment, the initializing the tuning operation further includes: setting a fraction of tuning budget towards a discovery of maximum entropy data points for each of the one or more of the plurality of distinct prior mixture models during the tuning operation; collecting a plurality of predictions from each of the one or more of the plurality of distinct prior mixture models based on the tuning operation; identifying a subset of the plurality of predictions that align with real-world data points.

In one embodiment, identifying the one or more sources of transfer tuning data from among the plurality of distinct sources of transfer tuning for the accelerated tuning of the target model is further based on identifying the distinct prior mixture model having the maximum informational entropy.

In one embodiment, a method for an accelerated tuning of hyperparameters of a model includes implementing a hyperparameter tuning service that tunes hyperparameters of a target model of subscriber to the hyperparameter tuning service, wherein the hyperparameter tuning service is hosted on a distributed network of computers that: assesses one or more groupings of subject models associated with a plurality of distinct sources of transfer tuning data, wherein the assessing includes implementing one or more of: [1] a model relatedness assessment for each of a plurality of distinct pairwise subject models, and [2] a model coherence assessment for each of the plurality of distinct pairwise subject models; constructs a plurality of distinct prior mixture models based on one or more of the relatedness metric value and the coherence metric value for each of the plurality of distinct pairwise subject models, wherein the plurality of distinct prior mixture models comprise a composite of two or more of the subject models of the one or more groupings of subject models; assesses each of the plurality of distinct prior mixture models; identifies a model evidence fraction for each of the plurality of distinct prior mixture models based on the assessment; identifies one or more sources of transfer tuning data from among the plurality of distinct sources of transfer tuning for an accelerated tuning of a target model based on identifying a distinct prior mixture model having a satisfactory model evidence fraction; and accelerates a tuning of hyperparameters of the target model based on transfer tuning data obtained from the identified one or more sources of transfer tuning data associated with the distinct prior mixture model having the satisfactory model evidence fraction.

In one embodiment, implementing the model relatedness assessment includes: computing a relatedness metric value for each of the plurality of distinct pairwise of subject models, wherein the relatedness metric value relates to a computed value probative of a degree of relation between at least two distinct models In one embodiment, implementing the model relatedness assessment includes: computing a coherence metric value for each of the plurality of distinct pairwise of subject models, wherein the coherence metric value relates to a measure that identifies or indicates a degree to which output data of subject models of a given pairwise of subject models at least two models under evaluation come into alignment.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. A System and/or Service for Tuning a Model

As shown in FIG. 1, a tuning/optimization system 100 (model tuning service 100) includes an intelligent application program interface (API) 105, an intelligent model optimization platform no, a plurality of queue working machines 120, a platform database 130, a shared work queue 135, and an ensemble of optimization models 140.

The system 100 preferably implements an intelligent model optimization platform 110 including an ensemble of Bayesian optimization processes and machine learning techniques that functions to automate an optimization of features of a model, architecture of a model, and hyperparameters of a model using an ensemble of Bayesian optimization techniques, as described in U.S. Pat. No. 10,217,061, which is incorporated herein in its entirety by this reference.

The system 100 functions to implement an intelligent Application Program Interface (API) 105, as described in U.S. Patent Application No. 62/578,886, which is incorporated herein in its entirety by this reference, for interacting and implementing complex optimization trials via the remote intelligent optimization platform no. The API 105 may be specifically designed to include a limited number of API endpoints that reduce of complexity in creating an optimization work request, implementing optimization trials using the work request data, obtaining suggestions and/or results of the optimization trials, and potentially implementing an optimization feedback loop until a suitable optimization of an objective function of the work request is achieved in a minimal amount of time. The optimization work request, as referred to herein, generally relates to an API request that includes one or more hyperparameters that a user is seeking to optimize and one or more constraints that the user desires for the optimization trials performed by the intelligent optimization platform 110.

In a preferred embodiment, the API 105 comprises a Representational State Transfer (ReST) API that relies mainly on a stateless, client-server, cacheable communications protocol and in many cases, the Rest API uses the HTTP protocol in connecting and interacting with software applications over the web and cloud (distributed network systems) services efficiently.

The API 105 may additionally be configured with logic that enables the API 105 to intelligently parse optimization work request data and/or augment the optimization work request data with metadata prior to passing the optimization work request to the shared work queue 135 of the intelligent optimization platform 110. As shown in FIG. 4, a mixed system and process flow is provided that illustrates an example interactions between the API 105 and one or more components of the intelligent optimization platform 110.

The intelligent optimization platform 110 includes the plurality of queue worker machines 120 (which may also be referred to herein as optimization worker machines), the platform data 130, the shared work queue 135 and the ensemble of optimization models 140. The intelligent optimization platform 110 generally functions to interact with the API server implementing the API 105 to receive API requests for implementing new optimization work requests and returning responses or suggestions to the API 105. Using the plurality of intelligent queue worker machines 120, the intelligent optimization platform 110 functions to asynchronously execute a plurality of optimization work requests in real-time and in parallel. This asynchronous execution and parallel processes of the intelligent optimization system 110 provides speed in computing efficiencies in the exploration and exploitation processes (generally, optimization) of features, hyperparameters, models and system architectures.

Additionally, or alternatively, the system enables a user to implement and/or interact with the API 105 in multiple ways including via an API client application and/or via API web browser implemented over the web.

The intelligent optimization platform 110 may be implemented using a combination of computing servers. Preferably, the intelligent optimization platform is implemented via a distributed networked computing system, such as cloud computing systems, that allows the many processes implemented by the intelligent optimization platform no to be implemented in parallel and among disparate computers thereby, in some embodiments, mitigating the possibility of failure or bottlenecking in the optimization pipeline of the intelligent optimization platform 100. Accordingly, the intelligent optimization platform no may be implemented as a remote web service accessible by multiple clients over the Internet, the Web, or any suitable communication network (e.g., a global area network, a wide area network, a local area network, etc.) that may function to place disparate computing resources in operable connection and communication.

The plurality of intelligent queue worker machines 120 preferably relate to services operating on the intelligent optimization platform 110 that executes code asynchronously with respect to other services or queue working machines of the platform 100. In some embodiments, each of the plurality of intelligent queue worker machines 120 functions to selectively trigger one or more optimization requests to one or more optimization engines of the ensemble of optimization engines 140. And, once the work on the optimization request is completed by the selected optimization engine(s), the queue working machine returns the responses or results to the platform database 130.

The plurality of intelligent queue worker machines 120 may be specifically configured with logic that enables each of the machines 120 to make dynamic and intelligent decisions in the selections of an ensemble component of the plurality of ensemble of optimization models 140. That is, each of the plurality of intelligent queue worker machines may function to selectively choose one or more optimization models of the ensemble 140 to execute one or more portions of an optimization work request.

The ensemble of optimization models 140 preferably includes a plurality of disparate optimization models that operate to optimize hyperparameters, features, models, system architectures and the like using varying optimization algorithms. In a preferred embodiment, the ensemble of optimization models 140 define a core optimization engine of the intelligent optimization platform 110. The features and the parameters of the core optimization engine comprising the ensemble of optimization models 140 may also be optimized continually by one or more of the intelligent queue worker machines 120 (e.g., using Hyperopt, etc.).

The ensemble of optimization models 140 may include any number of models including, for example: a Low-Discrepancy sequence model, a Metric Optimization Engine (MOE) model (and variants thereof; e.g., MOE with one-hot encoding), a Tree-structured Parzen Estimators (TPE) model and variants thereof, a Latin Hypercube model, a Swarm model, and the like. Each of these models of the example ensemble of optimization models may function to encode categorical parameters differently from other member models of the ensemble and may include some interdependencies that require combinations of the models to work together. Each of these models may be individually selectable or selectable in combination by or using the intelligent worker queue machines 120.

In a preferred embodiment, the plurality of intelligent queue working machines 120 may be implemented on a separate computing server than the API 105. In this way, long-running asynchronous processes do not adversely affect (e.g., slow down) a performance of an API computing server and mainly, a capacity of the API computing server to service API requests.

Additionally, the plurality of intelligent queue worker machines 120 include multiple, distinct intelligent queue worker machines 120 that coordinate optimization work request from the shared work queue 135 received via the API 105 with the ensemble of optimization models 140.

The platform database 130 functions to collect and stores any or all values generated by the system 100 including values generated when executing an optimization work request by the intelligent optimization platform no. Specifically, each of the plurality of intelligent queue worker machines may function to store within the platform database 130 optimized hyperparameter values, optimized hyperparameter values of an optimization work request, suggestions, surrogate models, partial information responses, and the like. The API 105 may be operable communication with the platform database 130 via a communication network and may function to pull suggestions and/or response data via an API call or request.

The machine learning models, optimization models, and/or the ensemble of machine learning models may employ any suitable optimization algorithms and/or machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in implementing the intelligent optimization platform 110 and/or other components of the system 100.

The system 100 may additionally include a surrogate model generator (implemented via one or more of the optimization models 140) that may be implemented by the intelligent optimization platform no. Specifically, when an API request is received by the system 100 that requests a status or suggestions of a partially completed (or incomplete) optimization work request, the intelligent optimization platform 110 may function to identify candidate data points and other data (including suggested hyperparameter values and optimized hyperparameters values) generated by each of the plurality of intelligent queue worker machines 120 for responding to the partially completed optimization work request and further, may trigger one or more of the optimization models of the ensemble of optimization models to generate a surrogate (or proxy) model that can be used to test the uncertainty and/or the likelihood that a candidate data point would perform well in an external model. In one example, the system 100 may function to obtain hyperparameter values of a most recent job of a first intelligent queue worker machine implementing Hyperopt and cause one of the optimization models 140, such as MOE, to generate the surrogate model using the hyperparameter values to test how well the candidate hyperparameter value data points may perform.

The system 100 may also implement a ranking system 155 that functions to rank multiple suggestions for a given optimization work request (or across multiple optimization work requests for a given user) such that the suggestions having hyperparameter values most likely to perform the best can be passed or pulled via the API 105. The ranking system 155 may be implemented in any suitable manner including by the one or more optimization algorithms of the ensemble 140 that generated the suggestions. For instance, if MOE is used to generate a plurality of suggestions for responding to an optimization work request, the system 100 may function to use MOE to implement the ranking system 155.

It shall be noted that the sub-systems and components of the system 100 may be connected or placed in operable communication using any suitable network and any suitable manner. For instance, the components of the system 100 may be connected directly or indirectly over a network. The network may include any public (e.g., the Internet) or private network (e.g., intranet), a virtual private network, a wireless local area network, a local area network, a wide area network, a wireless wide area network, a global area network, a cellular network, any combination of the aforementioned and the like.

1.1 Model Tuning Subsystem: Transferred Learning

Figure 3:
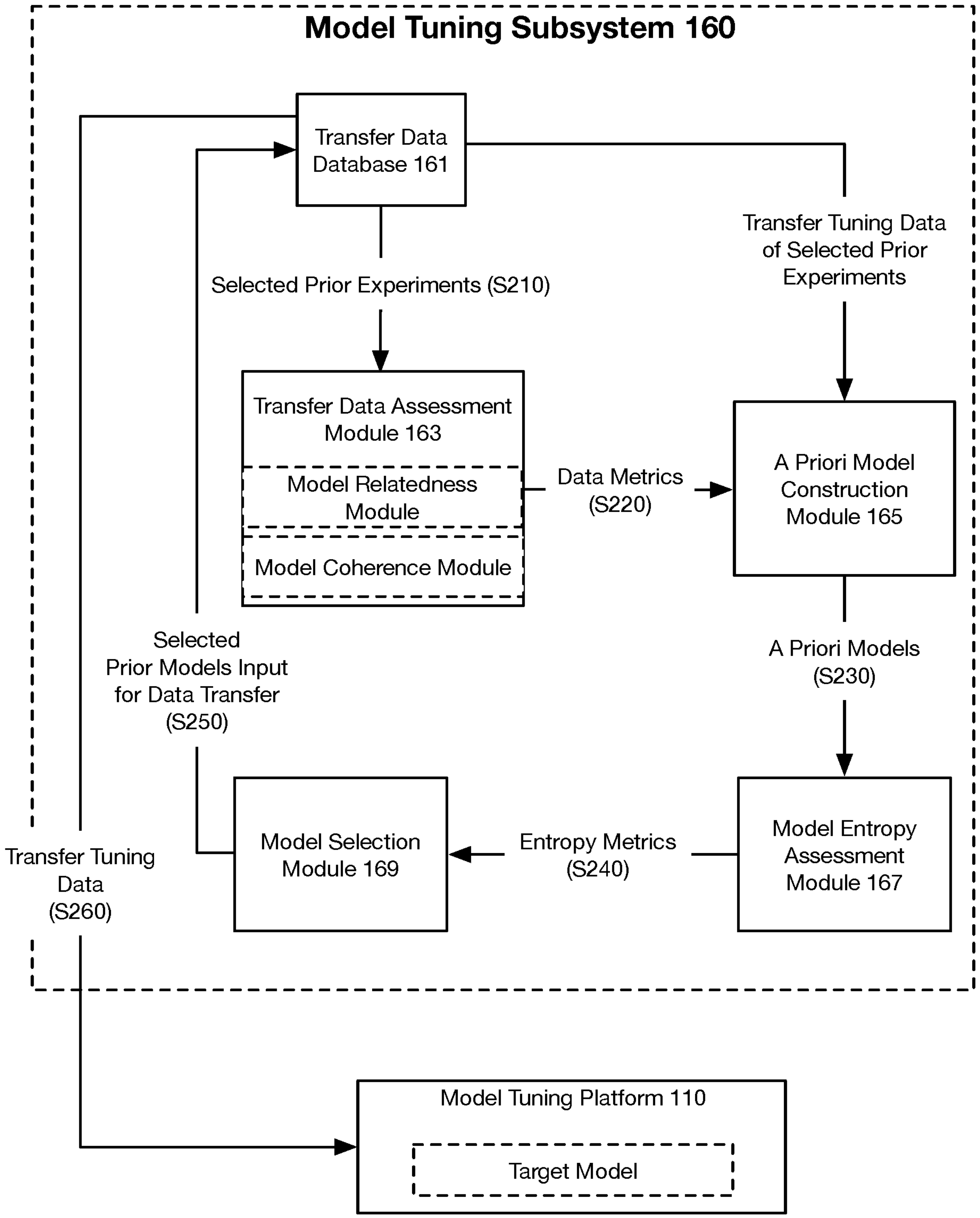
FIG. 3 illustrates a schematic of a subsystem 160 in accordance with one or more embodiments of the present application.

As shown in FIG. 3, the tuning system 100 may include a model tuning subsystem 160 that includes a transfer data database 161, a transfer data assessment module 163, a priori model construction module 165, a model entropy assessment module 167, and a model selection module 169.

The transfer data database 161 preferably functions to store data associated with a plurality of historical tuning experiments associate with a plurality of distinct models. In some embodiments, the transfer data database 161 may be part of or a sub-database of the platform database 130.

The transfer data assessment module 163 preferably functions to collect transfer tuning data associated with one or more identified and/or selected prior tuning experiments and perform one or more of a model relatedness assessment and a model coherence assessment of each corpus of distinct transfer tuning data.

The a priori model construction module 165 preferably implements one or more types of Gaussian processes and/or one or more optimization sources to build one or more prior models and/or one or more prior mixture models based on selected transfer tuning data.

The model entropy assessment module 167 preferably functions to evaluate each of one or more prior models and/or prior mixture models for maximum entropy.

The model selection module 169 preferably functions to perform one or more prior models and/or prior mixture models as suitable candidates for transferring into a subject tuning of a target model the historical transfer tuning data associated with each suitable candidate.

2. Method for an Accelerated Tuning of a Model

Figure 2:
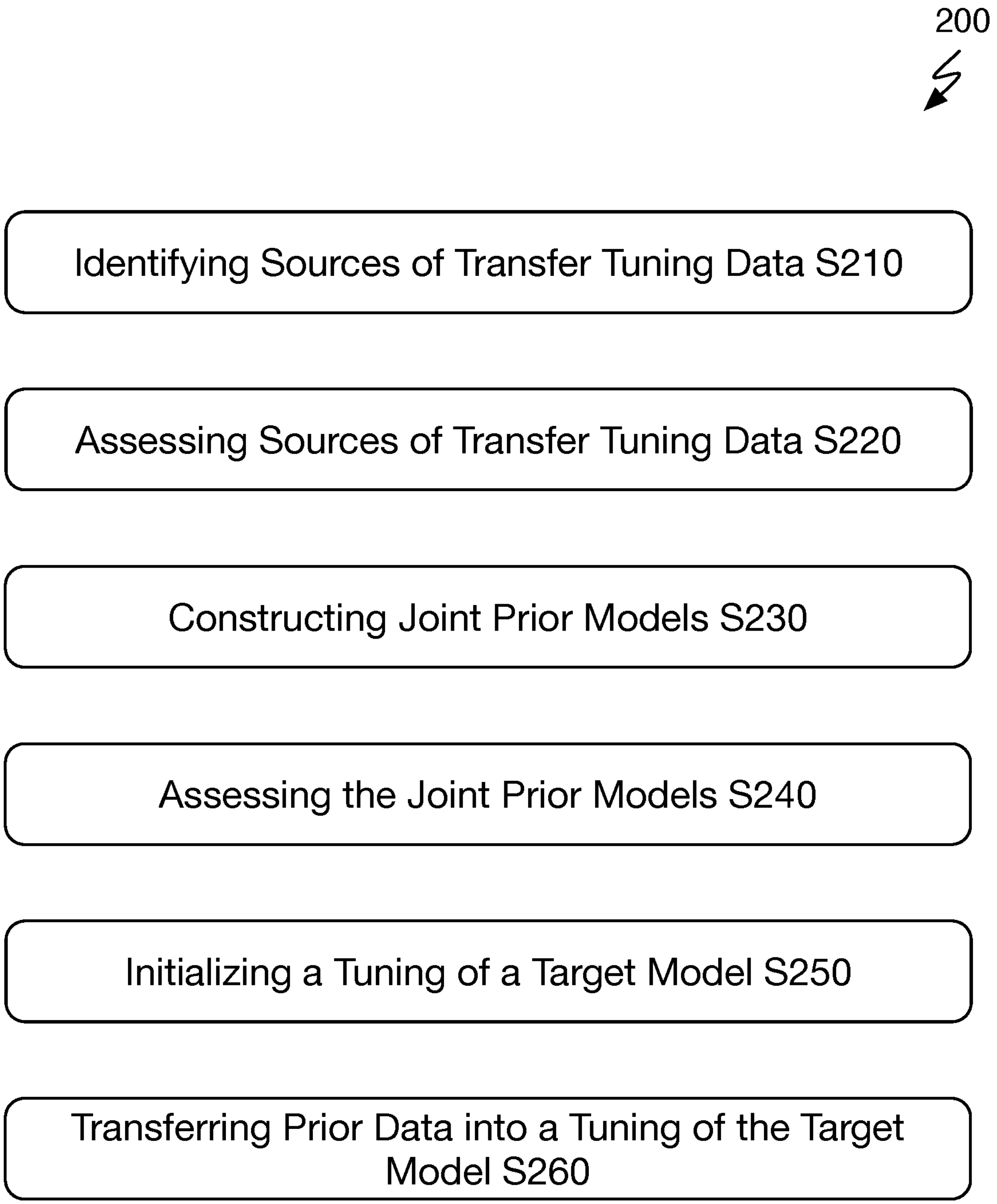
FIG. 2 illustrates an example method 200 in accordance with one or more embodiments of the present application.

As shown in FIG. 2, a method 200 includes identifying one or more sources of transfer tuning data S210, assessing the sources of transfer tuning data S220, constructing one or more joint prior models S230, assessing each of the joint prior mixture models S240, initializing a tuning optimization session for a target model S250, and transferring prior data from one or more sources of transfer tuning data S260.

S210, which includes identifying sources of transfer tuning data, may function to enable an identification and/or a selection of one or more sources of transfer tuning data. Transfer tuning data as referred to herein may relate any form or type of data that may be observable and/or collected from a historical (hyperparameter) tuning work request, historical tuning session, a historical optimization experiment or optimization session in which one or more metrics of a model may have been optimized. In some embodiments, tuning transfer data may include observation data. Observation data may relate to observable data that is collected during an optimization of a given model and preferably relates to observed data relating to one or more metric values of a given model that implements one or more suggestions comprising proposed hyperparameter values. In the case that the observation data includes observed data collected during one or more optimization sessions of a given model, the observation data may include one or more tested or input hyperparameter values and corresponding resulting measured metric values (e.g., precision, robustness, recall, error rate, etc.) of the given model, weightings and/or coefficients associated with one or more features of the given model (algorithm or the like), and/or any observable and/or measurable attribute of the given model or optimization session.

In a first implementation, selecting one or more sources of transfer tuning data, may include selecting one or more historical optimization sessions or the like in which the model that was optimized may be the same or may be the substantially the same as a target model. That is, S210 may function to enable a selection of one or more sources of transfer tuning data in which the historical model and the target model may be structurally the same. For example, in one or more embodiments, a given historical model and a target model may have the same algorithmic structure. In another example, a given historical model and a target model may have a substantially same algorithmic structure with only a limited number of structural distinctions (e.g., different constants, one or more distinct features, etc.).

In a second implementation, selecting one or more sources of transfer tuning data, may include selecting one or more historical optimization sessions or the like in which the parameter space of a subject model of the one or more historical optimization sessions may be the same or may be substantially the same as a parameter space of a target model. That is, in some embodiments, the parameter space of a subject model of the one or more historical optimization sessions includes a space of possible parameter (hyperparameter) values that may be the same or substantially the same for a target model. In some embodiments, in which the space of possible parameter values between a given historical model and a target model are substantially the same, the space of possible parameter values for both models may overlap. In such embodiments, the given historical model may make a suitable candidate for selection if or when it is determined that the overlap in the space of possible parameter values of both the given historical model and the target model satisfies or exceeds a similarity threshold comprising a minimum similarity metric value. In this second implementation, a structure of the subject model and a structure of the target model may be different.

Additionally, or alternatively, in some embodiments, a plurality of sources of transfer tuning data, including an associated plurality of subject models, may be identified by a subscriber to the hyperparameter tuning system and/or tuning service. In such embodiments, the plurality of the sources of transfer tuning data may be identified as a transfer class that identifies the selected sources of transfer tuning data as a single corporate group. In some embodiments, S210 may function to pre-process the transfer class to identify clusters or natural groupings of distinct sources. In a preferred embodiment, S210 may function to assess the transfer class for natural clusters or related clusters of sources of transfer tuning data based on an analysis of variance.

Accordingly, in some embodiments, once the clusters of sources are defined from the transfer class, the method 200 may function to identify only one group as a valid group from which one or more sources of transfer tuning data may be selected from. In some embodiments, by grouping segments of the transfer class into two or more clusters of sources, S210 may naturally cluster together optimal sources of transfer tuning data and cluster together suboptimal sources of transfer tuning data. In such embodiments, selections of the sources of transfer tuning data may be made from the optimal cluster of sources of transfer tuning data. Additionally, or alternatively, covariant values of the resulting clusters of sources of transfer tuning data may be adjusted to increase the covariant value or coefficient of an optimal cluster and to reduce a covariant value of a suboptimal cluster. In some embodiments, the covariant value or the like of a cluster may be returned to a subscriber to provide data relating to a quality of one or more sources of transfer tuning data selected or identified by the subscriber.

In one or more embodiments, S210 may function to enable an identification of the one or more sources of transfer tuning data via an intelligent API, as described in U.S. Pat. No. 10,282,237, which is incorporated herein in its entirety by this reference. In such embodiments, S210 may function to receive via the intelligent API a tuning work request that includes a plurality of tuning parameters for tuning a target model. In some embodiments, a tuning work request for performing a transfer learning-based optimization of a target model may include, at least, an identification of one or more prior (historical) and/or cognate tuning work requests (i.e., transfer tuning sources) that a subscriber to the tuning service considers as being sufficiently related to the target model. In one embodiment, the identification of the one or more transfer tuning sources via the intelligent API may include details of the one or more transfer tuning sources that explicitly identifies the subject tuning sessions and/or optimization trials from which transfer tuning data for an enhanced tuning of the target model may be procured. In one example, identification data of the one or more transfer tuning sources may include a name and specific identifier associated with a subject tuning session and/or subject optimization trial. In this way, the tuning service may readily search and/or identify from data stores storing transfer tuning data the identified one or more sources of transfer tuning data.

In some embodiments, the identified sources of transfer tuning data may include one or more of a series of historical tuning experiments associated with a given subscriber to a model tuning service implementing the methods described herein, including the method 200.

2.2 Transfer Tuning Data Source Assessment

S220, which includes assessing the sources of transfer tuning data, may function to test a quality of each of the one or more identified sources of transfer tuning data. In a preferred embodiment, S220 may function to evaluate each source of transfer tuning data to determine whether a subject model of a historical optimization session and/or observation data of a historical optimization session may be informative towards an accelerated or otherwise, improved optimization or tuning of a target model.

In one embodiment, S220 may function independently evaluate each subject model associated with each source of transfer tuning data. In some embodiments, S220 may function to specifically test a quality of the predictions of each subject model associated with each respective source of transfer tuning data. It shall be noted that while S220 preferably functions to evaluate the quality of the predictions of a subject model, S220 may function to evaluate any suitable metric of quantitative/qualitative attribute of the subject model.

Additionally, or alternatively, S220 may function to determine whether the subject models associated with the one or more identified sources of transfer tuning data demonstrate similar behaviors and/or predictive performances to a target model or of a model executing in the real world. In one embodiment, S220 may function to independently evaluate each of a plurality of subject models of a plurality of distinct sources of transfer tuning data based on a same or substantially similar input data set or any other meaningful input measure. Thus, in an independent setting for each of the plurality of distinct subject models, S220 may function to observe and/or collect the predictions or other outputs of each of the plurality of distinct models as evaluative assets that may be used for identifying relatedness and/or coherence between groupings of the plurality of distinct subject models or related and/or coherence between the subject (historical) models and a target model, which may be the subject of an impending or active tuning.

2.2.1 Model Relatedness Assessment

Accordingly, S220 may, additionally or alternatively, function to identify relatedness and/or coherence between pairs and/or groupings of subject models based on testing behaviors of the subject models. In one embodiment, S220 may function to identify whether pairs or groupings of subject models under evaluation satisfy one or more relatedness thresholds and/or one or more relatedness metrics.

In a preferred embodiment, S220 may function to evaluate subject models in pairwise such that each of the two distinct subject models may be compared directly to each other on a one-to-one basis. Thus, in some embodiments, if a pool of subject models are under evaluation, S220 may function to arrange a plurality of distinct pairwise between the subject models within the pool such that behaviors of each subject model may be compared against the behaviors of each distinct subject model within the pool.

For each pairwise of subject models under evaluation, S220 may function to compute a relatedness metric value. A relatedness metric value as referred to herein preferably relates to a computed and/or measured value that may be probative of a degree of relation between at least two distinct models. In one or more embodiments, a relatedness metric value may be calculated based on comparisons and/or assessments of one or more distinct model behaviors (e.g., predictive behaviors, distribution of model predictions, accuracy, etc.) of a pairwise of subject models under evaluation. Each observable and/or selected model behavior may be measured with a distinct metric, such as an accuracy metric, efficiency/speed metric, robustness metric, and/or the like. In computing the relatedness metric value, S220 may function to measure, for each subject model of a pairwise, one or more distinct performance metric values and correspondingly, compare and/or evaluate the one or more distinct metric values of the subject models. Accordingly, in some embodiments, the relatedness metric value may be computed based on a composite of two or more distinct metric values for a pairwise of subject models under evaluation. In some embodiments, the relatedness metric value may be computed based on an evaluation of a single distinct metric value.

Additionally, or alternatively, S220 may function to normalize each of the distinct performance metric values (e.g., accuracy metric, efficiency metric, and the like) and apply any suitable computational algorithm and/or math operation to compute the relatedness metric value. For instance, all performance values for a given subject model may be normalized to be between a range of zero and one. In such example, S220 may function to find an average between the distinct performance metric values whereby the average performance metric value may be the relatedness value.

Accordingly, S220 may function to assign a computed relatedness metric value to each pairwise of subject models.

In a preferred embodiment, S220 may function to identify and/or estimate whether a pairwise of subject models are sufficiently related based on a relatedness threshold (e.g., a minimum relatedness metric value). That is, in such preferred embodiment, S220 to evaluate a given relatedness metric value for a pairwise of subject models against a predetermined relatedness threshold. Accordingly, if given relatedness metric value of a pairwise of subject models satisfies or exceeds the relatedness threshold, S220 may function to identify the pair of subject models as related or sufficiently related. Conversely, if the given relatedness metric value of the pairwise of subject models does not satisfy the relatedness threshold, S220 may function to identify the pair of subject models as not sufficiently related.

Additionally, or alternatively, S220 may function to rank each pairwise of subject models based on the relatedness metric value computed for each pairwise.

2.2.2 Model Coherence Assessment

Additionally, or alternatively, S220 may function to identify coherence between two or more subject models of the one or more sources of transfer tuning data. In one embodiment, S220 may function to measure a coherence metric value between a pairwise of subject models under evaluation. S220 may function to perform a pairwise analysis between variations of paired subject models from a pool of subject models under evaluation.

In one embodiment, S220 may function to define or collect a test corpus of input data (test stimulus) for evaluating a coherence metric value between a pairwise of subject models. In some embodiments, a same test stimulus used in evaluating or computing a relatedness metric value may be used in computing a coherence metric value for a given pairwise of subject models. A coherence metric value as referred to herein preferably relates to a measure that identifies or indicates a degree to which output data of at least two models under evaluation come into alignment, overlap, and/or match up. In a preferred embodiment, the coherence metric value may function to measure a degree to which two distinct output datasets of two subject models of a pairwise conform or relate to each other based on a same input dataset.

In some embodiments, the test corpus of input data may be derived or based on a subset parameter values and/or parameter input values evaluated or used in one or more tuning sessions and/or optimization sessions associated with the one or more sources of transfer tuning data. The test corpus of input data, in such embodiments, may be provided as into each subject model of a pairwise of subject models under evaluation. S220 may function to collect two or more output sets of the pairwise of subject models based on an input of the test corpus of input data.

In some embodiments, S220 may function to build output distributions for each of the subject models in a pairwise based on their respective output sets. In such embodiments, S220 may function to evaluate the output distributions of the pairwise of subject models to determine a degree of coherence between the respective output distributions of the subject models. In such embodiment, S220 may function to determine an increased coherence metric value when output data points for each of the subject models converge into alignment or near alignment. Conversely, S220 may function to determine a decreased coherence metric value when output data points between the pairwise of subject models diverge and/or may not be in alignment.

It shall be known that the coherence metric value may be computed using any suitable statistical analysis including performing a Z test to calculate a similarity and/or difference between two distributions under evaluation. Thus, computing a coherence metric value may include calculating one or more Z-statistic values for a given pair of output distributions of subject models under evaluation.

In one variation, S220 may function to compute a coherence metric value based on a mapping of the output data values of each of the subject models of a pairwise in n-dimensional space. In such variation, S220 may function to compute the coherence metric value based on one or more cluster analysis techniques to determine an amount of overlap between clusters of the output data of the subject models. The greater the overlap between clusters of the output data, S220 may function to compute an increase in coherence and conversely, the lesser the overlap between clusters of the output data, S220 may function to compute a decrease in coherence.

Additionally, or alternatively, S220 may function to identify whether the subject models of a pairwise may be coherent based on an evaluation of a computed coherence metric value for the pairwise to a coherence threshold. The coherence threshold may be any arbitrary or statistically significant (minimum or maximum) value that may be applied against a computations of a coherence metric value of a pairwise and/or any combination of subject models.

Additionally, or alternatively, S220 may function to identify maximum coherence between two or more subject models under evaluation. In a preferred embodiment, S220 may function to identify one or more maximum coherence points between a pairwise of subject models under evaluation. A maximum coherence point as referred to herein preferably relates to instances in which an output data points of at least two subject models converge and/or come into alignment. That is, in some embodiments, a maximum coherence point includes an instance in which a same test input data into at least two distinct subject models under comparison generates an output data point for each of the distinct subject models that are the same or nearly the same.

In response to identifying maximum coherence points between at least two subject models, S220 may function to collect or identify the one or more test input data values that result in a maximum coherence for each pairwise of subject models and define or construct a corpus of maximum coherence test input data. Thus, in some embodiments, for each distinct pairwise of subject models, S220 may function to define a corpus of maximum coherence test input data. Additionally, or alternatively, S220 may function to define or construct the corpus of maximum coherence test input data based on a collection of a maximum coherence test input data from all tested pairwise of subject models.

Additionally, or alternatively, S220 may function to rank each pairwise of subject models based on the computed coherence metric value computed for each pairwise. Accordingly, S220 may function to specifically identify which of the one or more pairwise of subject models have a statistically significant coherence based on one or more of a ranking and/or a relation between each respective coherence metric value and a coherence threshold.

2.3 Joint a Priori Model Construction

S230, which includes constructing one or more joint a priori models, may function to build one or more prior mixture models that include a composite of two or more subject models. In a preferred embodiment, the composition of the prior mixture model preferably includes a combination of two or more subject models selected from a pool of historical subject models of the one or more sources of transfer tuning data. In such preferred embodiments, S230 may function to select suitable joint model candidates preferably from a subset of subject models that were previously assessed (as in S220) as having one or more of a suitable relatedness metric value and a suitable coherence metric value. A suitable relatedness metric value and a suitable coherence metric value may include or relate to a relatedness metric value and a coherence metric value that respectively satisfy a relatedness threshold and a coherence threshold.

Accordingly, in one or more embodiments, S230 preferably implements a Gaussian process to generate the one or more prior mixture models based on an input and/or an identification of suitable joint model candidates. In such embodiments, the one or more prior mixture models constructed using a Gaussian process or the like may include select component parts of each of subject model within a group of suitable joint model candidates. Preferably, the one or more joint prior mixture models, as constructed, create a strong cohesion that demonstrate a strong or a most informative set of prior beliefs.

2.4 Model Evidence of Joint a Priori Models

S240, which includes assessing each of the joint prior mixture models, may function to evaluate each of the joint prior mixture models for model selection based on their respective model evidence fraction. In a preferred embodiment, S240 may function to compute model evidence based on comparisons between two distinct joint prior mixture models. In a specific embodiment, S240 may function to provide input of a dataset to each joint prior mixture model under evaluation. Responsive to the dataset, each joint prior mixture model may function to generate respective outputs that may be evaluated as a model evidence quantity for each model.

Accordingly, S240 may function to fractionally compare the model evidence quantity of a pair of distinct joint prior mixture models and generate a model evidence fraction or quantity for the joint prior mixture model defining the dividend in the fractional comparison.

Additionally, or alternatively, S240 may function to rank the joint prior mixture models based on their respective model evidence quantity.

2.5 Tuning Initialization & Model Entropy Assessment of Joint a Priori Models

S250, which includes initializing a tuning optimization session for a target model, may function to start a new tuning and/or optimization session of the target model. Additionally, or alternatively, S250 may function to determine a distinct joint model of the one or more joint prior mixture models having a maximum informational entropy. Accordingly, in such embodiments, S250 may function to identify an entropy metric value for each of the one or more joint prior mixture models. Maximum entropy as referred to herein preferably relates to one or more points and/or one or more of a priori models that best inform or predict a current state of knowledge.

In some embodiments, S250 may function to allocate a fraction of a tuning budget (e.g., observation budget) to identify maximum entropy points of the one or more joint prior mixture models. The tuning budget as referred to herein preferably relates to a maximum number of optimization trials that may be performed during a tuning of the hyperparameters of a target model whereby each optimization trial may result in a suggestions of proposed hyperparameters for tuning the target model. For instance, if a tuning budget includes a maximum of ten (50) optimization trials, S250 may function to perform 50 distinct optimizations of the hyperparameters of a target model or the like and output 50 distinct suggestions of proposed hyperparameter values for that may tune or optimize the target model.

Accordingly, at an initialization of a tuning and/or optimization of a target model, S250 may function to allocate a fraction of the tuning budget for identifying maximum entropy points of the one or more joint prior mixture models. In one example, if a tuning budget for tuning one or more aspects of a target model includes fifty (50) tuning/optimization trials, S250 may function to set a fraction, such as ten (10) tuning trials of the 50 tuning trials, to generate predictions using the one or more joint prior mixture models. In this example, S250 may function to generate at least 10 suggestions and/or 10 predictions using the one or more joint prior mixture models based on allocation fraction of the tuning budget.

In a preferred embodiment, S250 may function to measure each of the plurality of predictions of the one or more joint prior mixture models against a current state of knowledge, which may relate to a plurality of distinct real-world data points or values. S250 may function to identify as maximum entropy data points the one or more or a subset of the plurality of predictions of the prior models that most closely align (e.g., that satisfy an alignment threshold, such as a minimum proximity or maximum difference between points, etc.) with data points associated with the current state of knowledge.

Accordingly, based on the identified maximum entropy data points, S250 may function to identify which of the joint prior mixture models produces the most optimal and/or best outcomes.

2.6 Data Transferability+Prior Data Supported Tuning Initialization of a Target Model S260, which includes transferring prior data from one or more sources of transfer tuning data, may function to select one or more sources of transfer tuning data and provide the transfer tuning data from the selected sources for accelerating a tuning of a target model.

In a first implementation, S260 may function to select the one or more sources of transfer tuning data based on identifying one or more of a plurality of joint prior mixture models producing maximum entropy data points. That is, in this first implementation, S260 may function to assess the maximum entropy data points of each of a plurality of distinct joint prior mixture models against an entropy threshold. If the maximum entropy data points of a given one of the plurality of distinct joint prior mixture models satisfies or exceeds the entropy threshold, S260 may function to select the given one of the plurality of distinct joint prior mixture models as a selected source of transfer tuning data. Once selected, S260 may function to transfer into a tuning and/or optimization session of a target model the prior and/or historical transfer tuning data associated with each of the prior component models of the selected joint prior mixture model. In such embodiment, a collection of the transfer tuning data from each of the prior component models may define a mixed corpus of transfer tuning data.

In a second implementation, S260 may function to specifically and/or individually select one or more component models from the one or more of the plurality of joint prior mixture models based on the maximum entropy data points. In such second implementation, S260 may function to assess and/or select the one or more joint prior mixture models to determine which component models defining the mixture models may be the most likely contributor to each of the maximum entropy data points. Once selected, S260 may function to transfer into a tuning and/or optimization session of a target model the prior and/or historical tuning data associated with each of the individually selected prior component models. In such embodiment, the transfer tuning data from each of the prior component models may define a distinct corpus of transfer tuning data.

In a third implementation, for the one or more joint prior mixture models producing maximum entropy data points, S260 may function to augment a transferability parameter to each of plurality of joint prior mixture models. The transferability parameter preferably relates to a model parameter with one or more learned values that function to upweight (i.e., increase a weighting/coefficient value) and/or downweight (i.e., decrease a/coefficient value) a transferability coefficient value of a transferability parameter augmented to each of the plurality of prior mixture models. In some embodiments, the transferability coefficient value determined by the transferability parameter may be referred to as a transfer weight value. In a preferred embodiment, the transferability parameter may function to learn a transfer weight value for each transferability parameter associated with each distinct model of the plurality of distinct joint prior mixture models based on an input of observed maximum entropy values and/or any other suitable observed value produced by the respective prior models.

In a fourth implementation, S260 may function to generate or create an artificial dataset of accelerated learning data that may be used to initialize or seed a tuning operation of a target model. In such embodiments, the artificial dataset may include an intelligent hypothesis of data that is believed to assist in accelerating a tuning of a target model. In some embodiments, S260 may function to combine both historical transfer tuning data and an artificial data of accelerated learning data to seed or otherwise, initialize a tuning operation for a target model.

Accordingly, for a system and/or tuning session that includes a plurality of distinct sources of transfer tuning data comprising a plurality of distinct joint prior mixture models, a distinct transferability parameter may be associated with each of the plurality of distinct joint prior mixture models and may function to upweight or downweight the associated distinct joint prior mixture model based on one or more observed values, such as maximum entropy values, during the course of an online or live optimization of a target model. In such circumstance, based on the transfer weight value associated with each distinct transferability parameter, S260 may function to increase or decrease an amount of prior tuning data transferred from a respective joint prior mixture model based on an increase or a decrease of a weighting of the respective transferability parameter. That is, as a live tuning/optimization of a target model is performed by a tuning system and/or tuning service, an amount of prior transfer tuning data transferred into the live tuning/optimization of the target model from the prior models may fluctuate in that the prior transfer tuning data transferred from a respective prior model may progressively increase over time and/or progressively decrease over time as the live tuning/optimization of the target model progresses.

While some embodiments of the present application preferably assign and/or augment a transferability parameter to joint prior mixture models, it shall be noted that the method 200 may function to augment the transferability parameter to singular and/or non-joint prior models and similarly, select and transfer prior transfer tuning data associated therewith on the basis of a coefficient value associated with the transferability parameter associated with each distinct singular model.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. An apparatus comprising:

interface circuitry;

instructions; and programmable circuitry to be programmed by the instructions to:

test a first subject model and a second subject model against a common corpus of test stimulus;

determine a similarity metric based on a comparison of performance metrics for the first and second subject models;

determine a first pairwise relatedness metric based on the testing and the similarity metric;

select the first and second subject models to generate a joint model based on a comparison of the first pairwise relatedness metric and a second pairwise relatedness metric determined for another combination of subject models;

run multiple tuning trials of the joint model to identify qualifying entropy data points from a plurality of predictions by comparing the plurality of predictions against empirical data points to identify predictions that match with the empirical data points;

select the joint model from a plurality of joint models after a determination that the qualifying entropy data points of the joint model satisfy an entropy threshold; and initialize a hyperparameter tuning session of a target model with historical transfer tuning data associated with the first and second subject models of the selected joint model to reduce a number of hyperparameter tuning trials for the target model, the initializing includes pre-populating the hyperparameter tuning session of the target model with tested hyperparameter values and corresponding measured metric values from the first and second subject models prior to starting a tuning trial of the target model.

2. The apparatus of claim 1, wherein the programmable circuitry is to:

access the first and second subject models in a pool of historical subject models; and select the first and second subject models as a pair of subject models to generate the joint model after a relatedness metric value corresponding to a relatedness between the first and second subject models satisfies a relatedness threshold.

3. The apparatus of claim 2, wherein the programmable circuitry is to:

determine a second relatedness metric value for a third subject model and a fourth subject model from the pool of historical subject models; and after a determination that the second relatedness metric value does not satisfy the relatedness threshold, not select the third and fourth subject models as a pair of subject models to generate the joint model.

4. The apparatus of claim 1, wherein the programmable circuitry is to:

compare a behavior of the first subject model to a behavior of the second subject model; and select the first and second subject models based on the comparison.

5. The apparatus of claim 1, wherein the historical transfer tuning data associated with the joint model is historical tuning data associated with the first and second subject models.

6. The apparatus of claim 1, wherein the programmable circuitry is to:

generate the entropy data points based on at least some predictions from the multiple tuning trials.

7. The apparatus of claim 1, wherein the entropy data points of the joint model are maximum entropy data points.

8. A storage device or storage disk comprising computer-readable instructions to cause programmable circuitry to at least:

test a first subject model and a second subject model against a common corpus of test stimulus;

determine a similarity metric based on a comparison of performance metrics for the first and second subject models;

determine a first pairwise relatedness metric based on the testing and the similarity metric;

select the first and second subject models to generate a joint model based on a comparison of the first pairwise relatedness metric and a second pairwise relatedness metric determined for another combination of subject models;

run multiple tuning trials of the joint model to identify qualifying entropy data points from a plurality of predictions by comparing the plurality of predictions against empirical data points to identify predictions that match with the empirical data points;

select the joint model from a plurality of joint models after a determination that the qualifying entropy data points of the joint model satisfy an entropy threshold; and initialize a hyperparameter tuning session of a target model with historical transfer tuning data associated with the first and second subject models of the selected joint model to reduce a number of hyperparameter tuning trials for the target model, the initializing includes pre-populating the hyperparameter tuning session of the target model with tested hyperparameter values and corresponding measured metric values from the first and second subject models prior to starting a tuning trial of the target model.

9. The storage device or storage disk of claim 8, wherein the computer-readable instructions are to cause the programmable circuitry to:

access the first and second subject models in a pool of historical subject models; and select the first and second subject models as a pair of subject models to generate the joint model after a relatedness metric value corresponding to a relatedness between the first and second subject models satisfies a relatedness threshold.

10. The storage device or storage disk of claim 9, wherein the computer-readable instructions are to cause the programmable circuitry to:

determine a second relatedness metric value for a third subject model and a fourth subject model from the pool of historical subject models; and after a determination that the second relatedness metric value does not satisfy the relatedness threshold, not select the third and fourth subject models as a pair of subject models to generate the joint model.

11. The storage device or storage disk of claim 8, wherein the computer-readable instructions are to cause the programmable circuitry to:

compare a behavior of the first subject model to a behavior of the second subject model; and select the first and second subject models based on the comparison.

12. The storage device or storage disk of claim 8, wherein the historical transfer tuning data associated with the joint model is historical tuning data associated with the first and second subject models.

13. The storage device or storage disk of claim 8, wherein the computer-readable instructions are to cause the programmable circuitry to generate the entropy data points based on at least some predictions from the multiple tuning trials.

14. The storage device or storage disk of claim 8, wherein the entropy data points of the joint model are maximum entropy data points.

15. A method comprising:

testing a first subject model and a second subject model against a common corpus of test stimulus;

determining a similarity metric based on a comparison of performance metrics for the first and second subject models;

determining a first pairwise relatedness metric based on the testing and the similarity metric;

selecting the first and second subject models to generate a joint model based on a comparison of the first pairwise relatedness metric and a second pairwise relatedness metric determined for another combination of subject models;

running multiple tuning trials of the joint model to identify qualifying entropy data points from a plurality of predictions by comparing the plurality of predictions against empirical data points to identify predictions that match with the empirical data points;

selecting, by executing an instruction with programmable circuitry, the joint model from a plurality of joint models after a determination that the qualifying entropy data points of the joint model satisfy an entropy threshold; and initializing a hyperparameter tuning session of a target model with historical transfer tuning data associated with the first and second subject models of the selected joint model to reduce a number of hyperparameter tuning trials for the target model, the initializing includes pre-populating the hyperparameter tuning session of the target model with tested hyperparameter values and corresponding measured metric values from the first and second subject models prior to starting a tuning trial of the target model.

16. The method of claim 15, including:

accessing the first and second subject models in a pool of historical subject models; and selecting the first and second subject models as a pair of subject models to generate the joint model after a relatedness metric value corresponding to a relatedness between the first and second subject models satisfies a relatedness threshold.

17. The method of claim 16, including:

determining a second relatedness metric value for a third subject model and a fourth subject model from the pool of historical subject models; and after a determination that the second relatedness metric value does not satisfy the relatedness threshold, not selecting the third and fourth subject models as a pair of subject models to generate the joint model.

18. The method of claim 15, including:

comparing a behavior of the first subject model to a behavior of the second subject model; and selecting the first and second subject models based on the comparison.

19. The method of claim 15, wherein the historical transfer tuning data associated with the joint model is historical tuning data associated with the first and second subject models.

20. The method of claim 15, including:

generating predictions based on the multiple tuning trials of the joint model; and generating the entropy data points based on at least some of the predictions.

* * * * *